(No Model.) 9 Sheets—Sheet 1.

G. E. EMERSON & L. G. MERRITT.
VENDING MACHINE.

No. 596,862. Patented Jan. 4, 1898.

Fig. 1.

Witnesses

Inventors
George E. Emerson
Louis G. Merritt
By J. R. Nottingham
Attorney (No Model.) 9 Sheets—Sheet 3.

G. E. EMERSON & L. G. MERRITT.
VENDING MACHINE.

No. 596,862. Patented Jan. 4, 1898.

Fig. 3.

Witnesses
Inventors
G. E. Emerson
L. G. Merritt
By J. R. Nottingham
Attorney (No Model.) 9 Sheets—Sheet 4.

G. E. EMERSON & L. G. MERRITT.
VENDING MACHINE.

No. 596,862. Patented Jan. 4, 1898.

Witnesses
Inventors
George E. Emerson
Louis G. Merritt
By J. R. Nottingham
Attorney

THE NORRIS PETERS CO., PHOTO-LITHO., WASHINGTON, D. C.

(No Model.) 9 Sheets—Sheet 5.

G. E. EMERSON & L. G. MERRITT.
VENDING MACHINE.

No. 596,862. Patented Jan. 4, 1898.

Fig. 5

Witnesses
C. E. Hunt
Simon P. Messer

Inventors
G. E. Emerson
L. E. Merritt
By J. R. Nottingham
Attorney (No Model.) 9 Sheets—Sheet 7.

G. E. EMERSON & L. G. MERRITT.
VENDING MACHINE.

No. 596,862. Patented Jan. 4, 1898.

(No Model.) 9 Sheets—Sheet 9.

G. E. EMERSON & L. G. MERRITT.
VENDING MACHINE.

No. 596,862. Patented Jan. 4, 1898.

Witnesses
C. E. Huel
Simon P. Meister

Inventors
George E. Emerson
Louis G. Merritt
By J. R. Nottingham
Attorney

UNITED STATES PATENT OFFICE.

GEORGE E. EMERSON AND LOUIS G. MERRITT, OF LOCKPORT, NEW YORK.

VENDING-MACHINE.

SPECIFICATION forming part of Letters Patent No. 596,862, dated January 4, 1898.

Application filed October 6, 1896. Serial No. 608,057. (No model.)

*To all whom it may concern:*

Be it known that we, GEORGE E. EMERSON and LOUIS G. MERRITT, citizens of the United States, residing at Lockport, in the county of Niagara and State of New York, have invented certain new and useful Improvements in Vending-Machines; and we do hereby declare the following to be a full, clear, and exact description of the invention, such as will enable others skilled in the art to which it appertains to make and use the same.

The invention relates to certain improvements in automatic vending-machines, more particularly to that class in which a cigar is delivered to the purchaser upon the insertion of a proper coin; and it consists, essentially, in the combination and arrangement of the several mechanisms and parts thereof which constitute the machine as an entirety, as will be hereinafter more fully described, and pointed out in the claims.

The invention has for its principal objects, first, to produce a machine which will automatically deliver a cigar directly from the box containing them by operating certain mechanism which is permitted to be moved by the insertion of a proper coin and which is instantly locked when the cigar is delivered to the purchaser; second, to separate improper coins from such as are intended to set the mechanism in operative condition, and, third, to lock the machinery when the allotted number of cigars has been delivered and the box emptied, so that a coin cannot be inserted until the empty box has been replaced by a full one. These objects are attained by means of the mechanism illustrated in the accompanying drawings, in which—

Fig. 11, a horizontal sectional view of the slotway.

For convenience in describing the construction of our machine we will hereinafter refer to the various mechanisms under the following heads, viz: "Base and frame," "Coin-slotway mechanism locking and unlocking the operating mechanism," "Cigar-box support," "Cigar-conveyer mechanism," "Cigar-delivery," "Operating mechanism," "Coin-releaser," "Register and slotway locking mechanism," and "General operation."

Referring to the drawings, like numerals and letters indicate like parts throughout the several views.

*Base and frame.*—The numeral 1 indicates the base, and 2 the frame, of the machine. The base consists of a flat metal plate cast with side rails 3 and a transverse slot 4 for the passage of the cigars into a proper delivery-receptacle. The frame consists of two metal side pieces of suitable shape, which have their outer lower side edges provided with suitable flanges, by means of which said side pieces are secured in proper position upon the base by screws passing through the flanged edges. The side pieces are each provided with a circular opening 5 for the reception of a suitable cigar-conveyer and with hangers 6, which are provided with suitable bearings for the journals of said conveyer.

Figure 1:
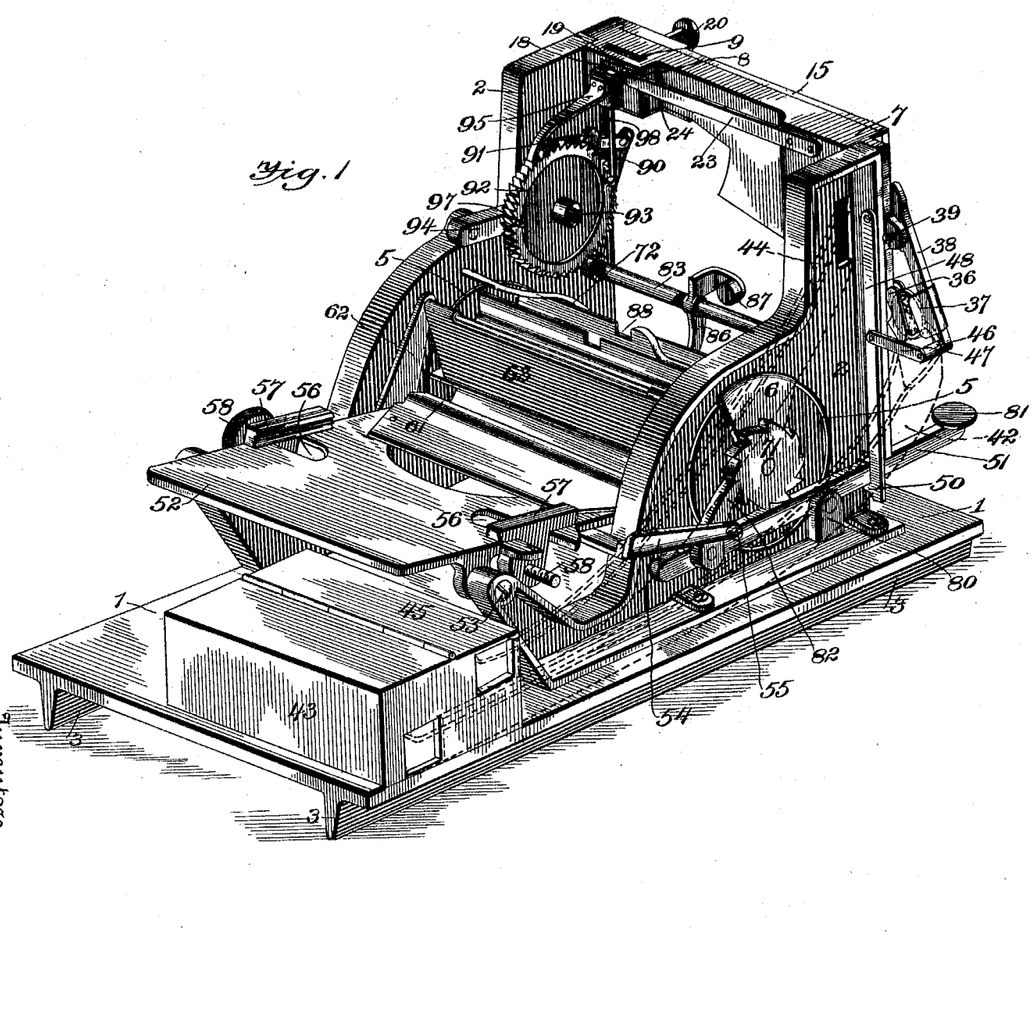
Figure 1 is a perspective view of the working parts of our machine, the case being removed, looking down from the rear to the front.
Figure 2:
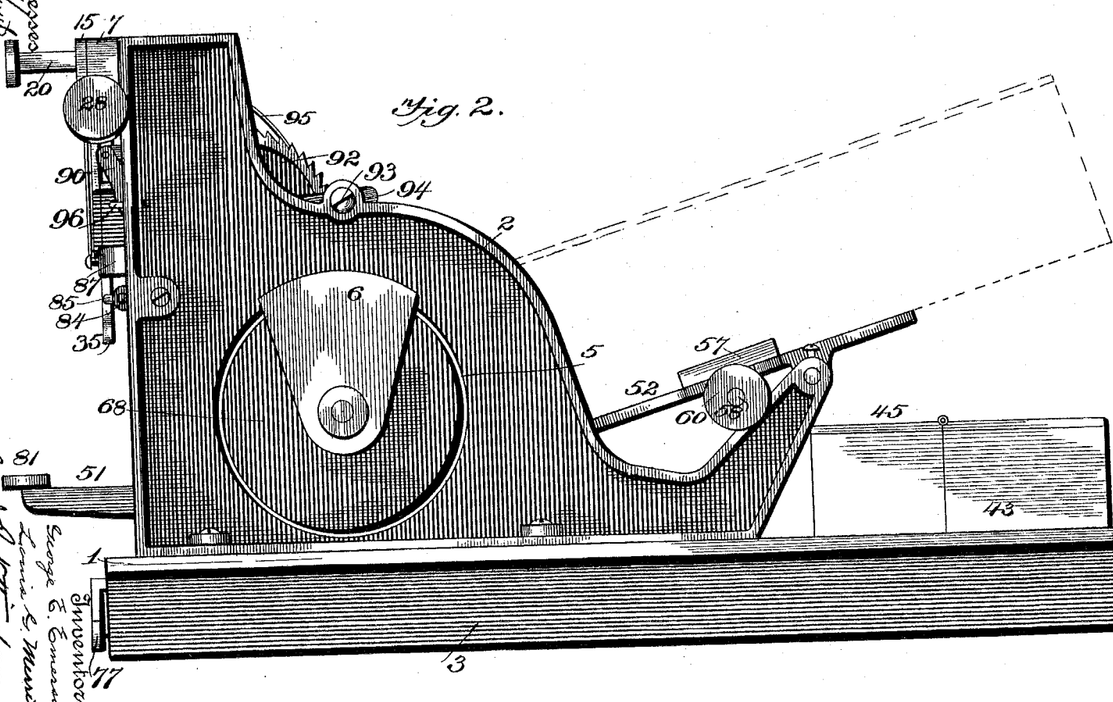
Fig. 2, an elevation of the left-hand side of the same.
Figure 3:
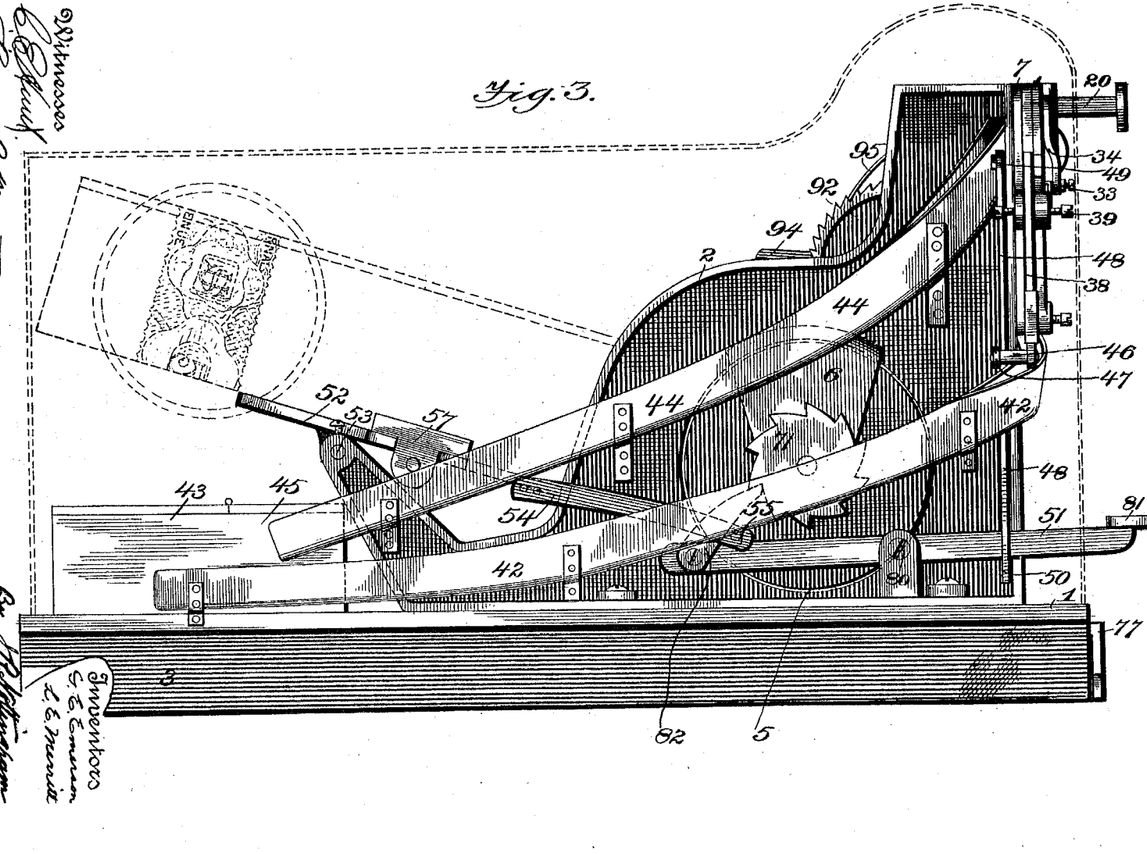
Fig. 3, a similar view of the opposite side, showing the case and cigar-box in dotted lines.
Figure 4:
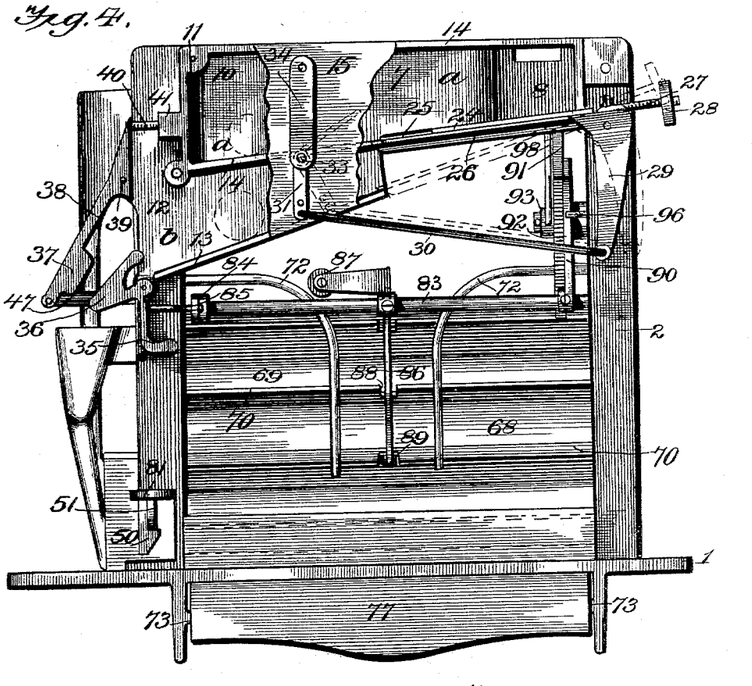
Fig. 4, a front elevation with a part broken away to show the construction of the coin-controlling mechanism.
Figure 5:
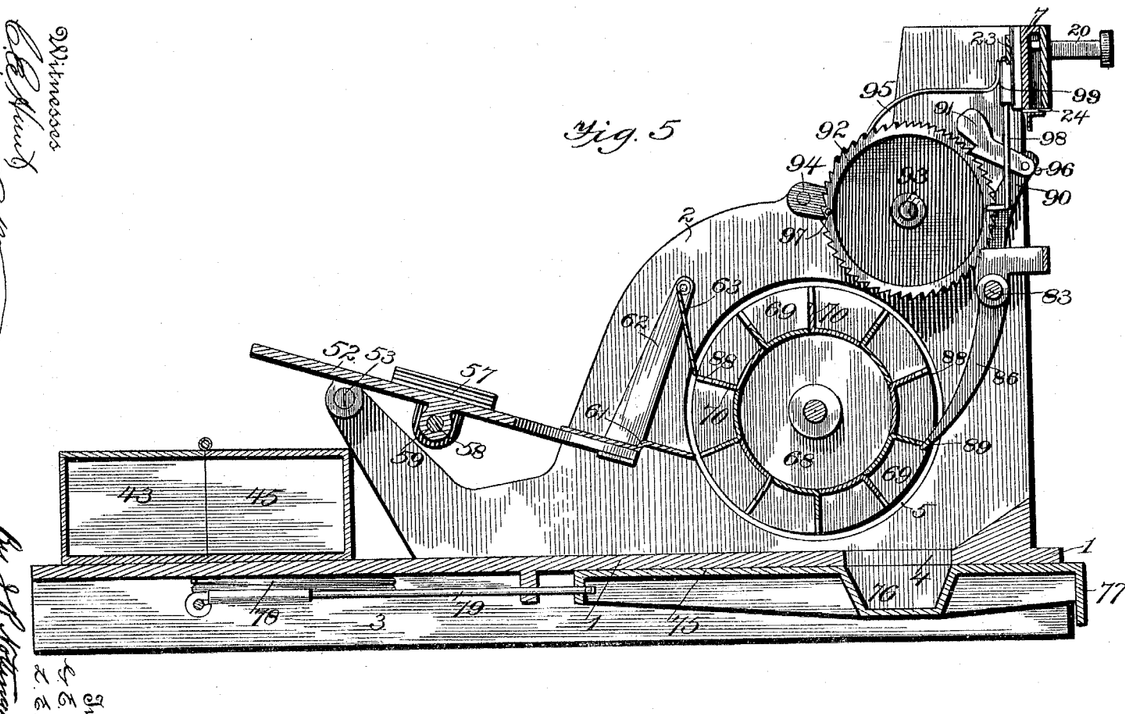
Fig. 5, a longitudinal vertical section looking toward the left side of the machine.
Figures 6, 9:
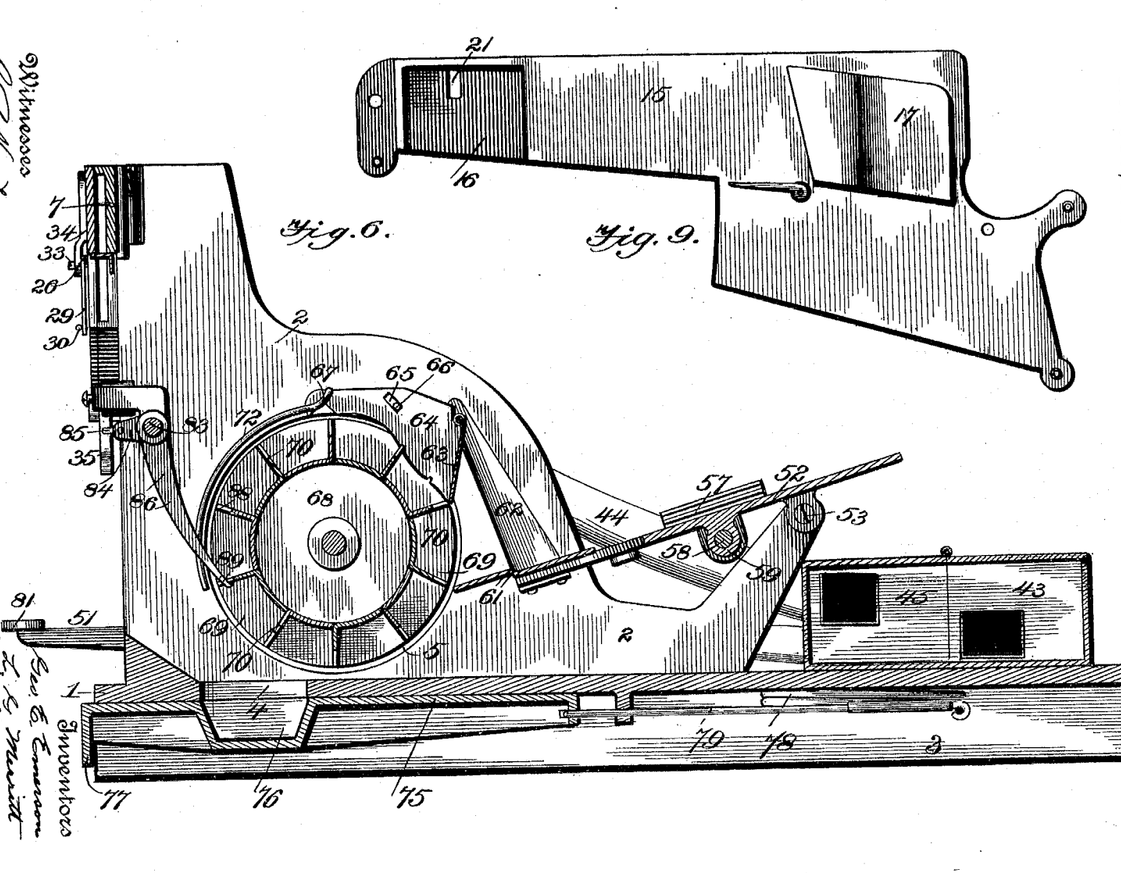
Fig. 6, a similar view looking toward the opposite side.
Fig. 9, a similar view of the inner side of the front plate.
Figure 7:
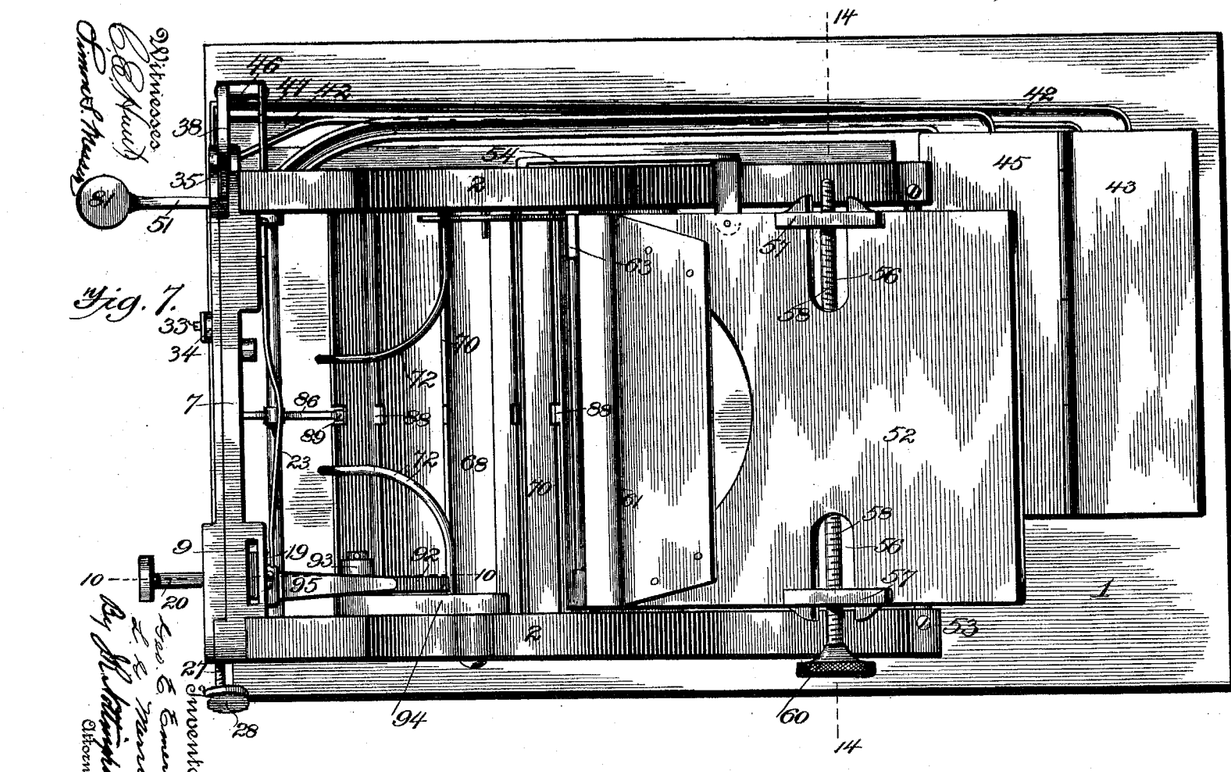
Fig. 7, a top plan view.
Figure 8:
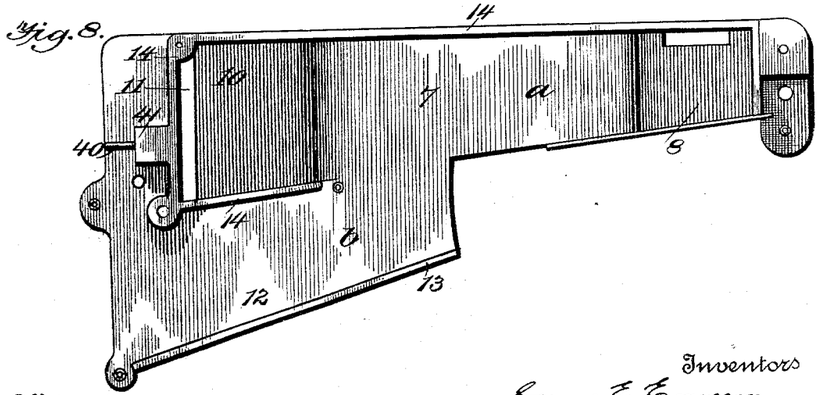
Fig. 8, a side elevation of the coin-slotway with the front plate removed.
Figure 10:
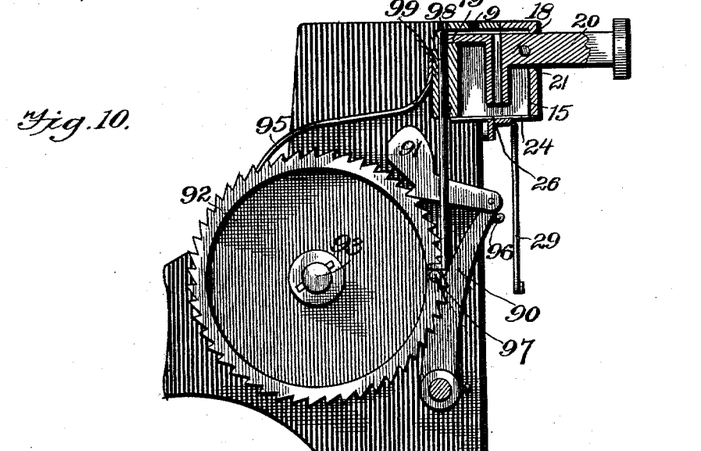
Fig. 10, a transverse vertical sectional view taken on line 10 10 of Fig. 7.
Figures 11, 15:
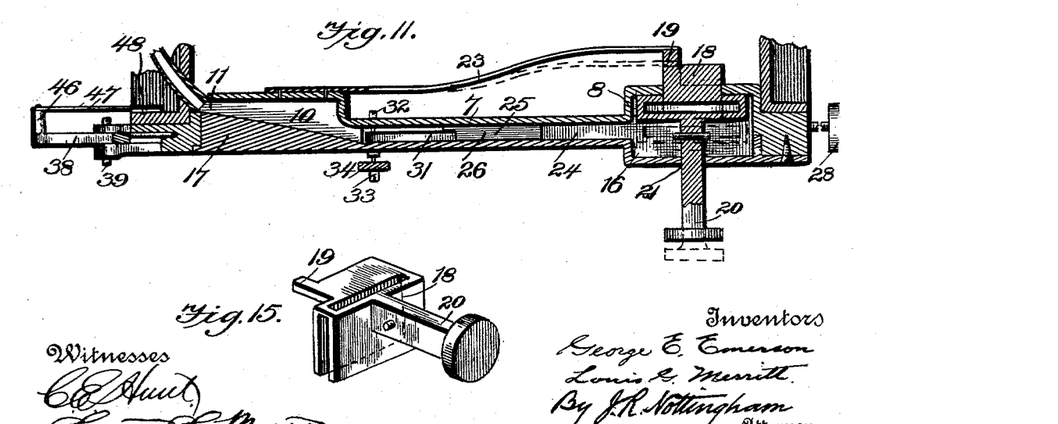
Figure 12:
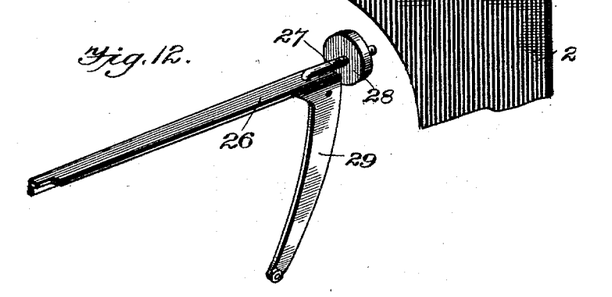
Fig. 12, a perspective view of the coin-tilting angle-lever.
Figure 13:
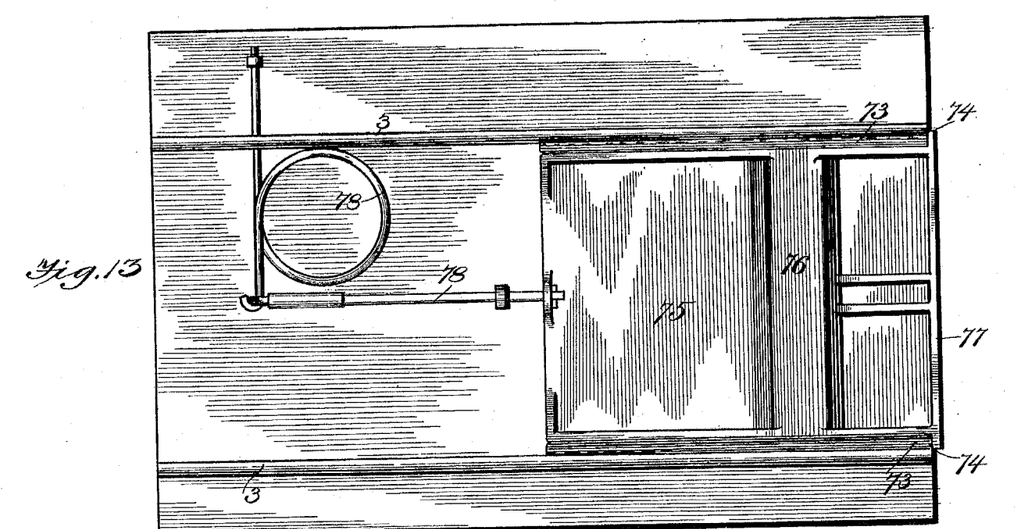
Fig. 13, a bottom plan view of the base of the machine.
Figure 14:
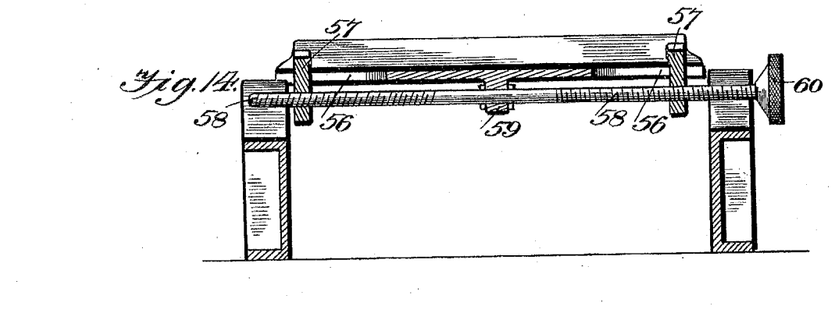
Fig. 14, a transverse vertical sectional view taken on line 14 14 of Fig. 7, and Fig. 15 a perspective view of the hollow slide.

*Coin-slotway.*—The numeral 7 indicates a plate which is secured at its ends to the flanged front edges of the respective side pieces constituting the frame. This plate is cast or formed near one end with a recess 8, having a coin-orifice 9 in its top edge, and near the other end with a similar recess 10, having an opening 11 at one side for the passage of improper coins. Said plate is provided with an extension 12, having an inclined lower edge provided with a flange 13, the top edge of the plate and one side and bottom edge of the recess 10 being formed with a similar flange 14, against which flanges is secured a plate 15, similar in shape to the plate 7. The plate 15 is formed with a recess 16, corresponding in shape to the recess 8, and with an offset 17, which sets into and partially fills the recess 10, leaving sufficient space for the passage of small and improper coins. When the two plates are secured together, two slotways are formed between them—one, as indicated by the letter $a$, for the passage of improper coins and the other, as indicated by $b$, for the passage of proper coins. Within the recess 8 is situated a movable hollow slide 18, which has openings at the top, bottom, and left-hand sides, the top opening being for the reception of all coins that are passed through the coin-orifice, while the bottom and side openings permit such coins to pass either to slotway $a$ or $b$, according to the character of the coin deposited, as will be more fully hereinafter explained. The hollow movable slide is provided with a projection 19, which extends through a slot in the back plate 7, and with a push-bar 20, which extends through a slot 21 in the front plate 15 and through the front of the casing, which is represented in dotted lines, Fig. 3. Against the projection 19 sets one end of a spring 23, which presses the slide forward, so as to keep its top opening normally out of alinement with the coin-orifice and thereby prevent the insertion of a coin until the slide is pushed back. When this is done, the top opening is caused to register or coincide with the coin-orifice, permitting a coin to be deposited. The recesses 8 and 16 being formed without a bottom the opening is closed by a plate 24, upon which the deposited coins drop. The slotway $b$ being also formed a part of the way without a bottom, the plate 24 is extended to the left to partially close the opening, but leaving a sufficient portion uncovered to form an opening 25 (see Figs. 4 and 11) for the passage of a proper coin to the slotway $b$.

Beneath the plate 24 is pivoted a tilting angle-lever 26, the free end of which extends a sufficient distance to close the opening 25 against the passage of coins lighter in weight than the desired or proper coin for which the machine may be regulated or set. The tilting angle-lever is provided with an arm 27, upon which is mounted an adjustable weight 28, by means of which said lever may be arranged to tilt under the weight of the required or proper coin. Depending from the tilting lever is an arm 29, to which is attached one end of a wire 30, the other end of the wire being attached to the outer arm of a two-armed lever 31, which is fulcrumed, at its connecting-point with the other arm, between two pins—a stationary pin 32, secured to the back plate, and an adjustable pin 33, screwed into a bracket 34, secured to the front plate. The other arm of the lever 31 sets in the space between the two plates and in its normal position forms an extension of the tilting angle-lever and in connection therewith forms normally the bottom of the slotway $a$ for all coins of lighter weight than those designed to set the mechanism into operation.

Fulcrumed at the lower left-hand edge of the extension 12 is an angle-lever 35, one arm of which is weighted to hold the said lever in and return it to normal position after being displaced by the means hereinafter described. The other arm of this lever is provided with two parallel fingers 36, which extend into the exit-opening of the slotway $b$ to receive the proper coin as it makes its exit therefrom and hold it in connection with a similar pair of fingers 37, secured to a lever 38, fulcrumed on a pin 39 between the front and back plates. The movement of the lever is limited by a stop-pin 40, secured in a lug 41 on the inside of the back plate.

The numeral 42 indicates a coin-chute which forms a continuation of the slotway $b$ and conveys the proper coin, after it has been released by the fingers 36 and 37, to a receptacle which may be arranged in any convenient position on the base 1, as indicated at 43. The numeral 44 indicates a chute which forms a continuation of the slotway $a$ and serves to convey improper coins to a suitably-arranged receptacle 45.

The operation of the above-described mechanism is as follows: The push-rod is pressed back until the slot in the top of the hollow movable slide coincides with the coin-orifice and the proper coin inserted. The coin, falling on its edge on the bottom plate 24, will roll upon the end of the tilting angle-lever, which, having been previously adjusted, will tilt downward, causing the coin to roll into the slotway $b$ and thence be caught by the fingers 36 and 37 and there held until released by the operation of certain other mechanism. The finger-lever 35 is prevented from backward movement as the coin rolls into the fingers by a stop hereinafter to be described.

If an improper coin of lighter weight than the required or proper coin should be deposited in the coin-orifice, it will not tilt the tilting angle-lever, but will roll over the same onto the confined arm of the angle-lever 31, and thence onto flange 14 and out through the opening 11 into the coin-chute 44. As the coin-orifice is constructed just the size to receive the required coin, larger coins cannot be deposited.

*Mechanism locking and unlocking the operating mechanism.*—The lower end of the finger-lever 38 is provided with a stud 46, on which is pivoted one end of a link 47, the other end of the link being pivoted on a flat metal bar 48, which has its upper end pivoted at 49 to the rear side of the flanged front edge of one side piece forming part of the frame. The lower end of the bar 48 is provided with a detent 50, which engages the operating-lever 51 and locks it against operation until the proper coin is deposited and caught by the fingers. When the coin is received by the fingers 36 and 37, the finger-lever 38 is forced outward, the movement being limited by the stop-pin 40. As the finger-lever moves outward it carries with it the locking-bar 48, to which it is attached by the link 47, and the engagement between the said bar and the operating-lever is broken, leaving the latter free to be operated.

*Cigar-box support.*—The numeral 52 indicates an oscillating table or support which is pivoted at 53 between the side pieces constituting the frame of the machine. The table near its forward end at one side is provided with an arm 54, having a pin or screw 55 passing through its free end and setting over the operating-lever 51, so that when the said lever is elevated the free end of the arm and the forward end of the table will also be elevated. When the operating-lever is released, the forward end of the table will fall or drop by its own weight, as the pivoted point is some distance to the rear of the center. The opposite sides of the table near the center are provided with slots 56, and working in these slots are adjustable clamping-heads 57, which are provided with screw-threaded openings and connected by a right and left hand threaded screw 58, passing transversely under the table and journaled in a bearing 59, secured to said table. The screw is provided at one end with a milled head 60, by means of which the clamp-heads may be moved to and from each other. The clamp-heads are provided on their inner faces with biting edges, which take into the sides of the cigar-box in order to firmly hold it in proper position. The table is provided near its forward edge with a transverse rib or abutment 61, against which the lower edge of the cigar-box rests when in place. The forward portion of the table is provided at opposite sides with a vertical arm 62, in the upper end of which are formed bearings for the journals of an oscillating gate 63, which is provided at one side with a forwardly-extending arm 64, having a slot 65, through which projects a pin 66, secured to the inner side of the side piece of the frame. The forward end of the arm 64 is recessed to form a detent 67, which engages successively the radial partitions of a cigar-conveyer drum, as will be hereinafter more fully described.

The cigar-box (indicated by dotted lines in Fig. 3) from which the cigars are to be vended is placed upon the oscillating table, which is arranged at an inclination sufficient to permit the cigars to roll out of the box and be fed, one at a time, into the conveyer-drum 68, the gate 63 being so arranged and operated as to prevent the passage of more than one cigar into a groove of said conveyer-drum.

*Cigar-conveyer mechanism.*—The cigar-conveyer drum 68 is journaled in suitable bearings made in the hangers 6 and is provided with a series of longitudinal grooves 69, formed by radial partitions 70. The shaft projects at one end beyond its bearings and has secured to it a ratchet-wheel 71, the teeth of which correspond in number to the grooves in the conveyer-drum.

The numeral 72 indicates two spring-arms secured to opposite sides of the frame and extending down over the periphery of the drum serve to hold the cigars in place until each groove reaches the proper point for delivery.

*Cigar-delivery.*—The base of the machine is provided at opposite sides with guide-rails 73, in which slide the flange edges 74 of a plate 75, having cast or formed therein a depression 76 to receive the cigars as they are delivered from the conveyer-drum through the transverse slot or opening 4. The plate 75 is provided at its forward edge with a downwardly-projecting ledge 77, by means of which the plate may be drawn out by the purchaser to obtain his purchase. The plate is held normally back beneath the base by means of a coiled spring 78, fastened below the base, and a link 79, connecting said plate to the spring.

*Operating mechanism.*—The operating-lever 51 is fulcrumed to a stud 80, located on the flange of one of the side pieces of the frame. The forward end of the lever extends through the front wall of the casing and is provided with a suitable handle 81, by means of which it can be depressed. Near the inner end the lever carries a pawl 82, which engages the teeth of the ratchet-wheel when the lever is depressed to rotate the conveyer-drum. The lever is held in normal position by its longer and weightier rear or inner end, and when depressed is returned to said position by said end.

The operation of these severally-described mechanisms is as follows: The locking-bar having been forced out of engagement with the operating-lever by the coin forcing out the finger-lever 38, as before stated, it is free to be depressed to rotate the drum with a step-by-step movement. At each step a single groove is moved forward to the extent of one tooth of the ratchet-wheel, the drum being locked against further rotation by the detent 67 engaging one of the radial partitions as the forward part of the table is caused to raise by the operating-lever forcing up the table-arm 54.

*Coin-releaser.*—The numeral 83 indicates a transverse shaft journaled at the front of the machine in suitable cone-bearings passing through the sides of the machine. Mounted on the shaft 83 is an adjustable arm 84, having a pin 85 projecting from it, which bears against the weighted arm of the finger-lever 35 when the coin is held between the fingers 36 and 37 and prevents the rearward movement of said lever 35. The arm 84 may be made adjustable on the shaft 83 by means of the usual binding or set screw. Adjustably screwed upon the shaft 83 near its center by means of a binding or set screw is a downwardly-projecting curved arm 86, which is provided with a weight 87, which holds the arm and shaft and its adjuncts in a normal position and returns them to such position after each operation of delivering a cigar. Each radial partition of the drum is provided with an open slot 88 to permit of the end of the curved arm 86 being set slightly into the grooves in the drum, so as to receive the cigar on its widened end 89, from which it is dropped into the delivery-receptacle. As the cigar is delivered onto the widened end 89 said end is forced outward, rocking the shaft 83 and causing the pin 85 of the arm 84 to move out of contact with the finger-arm 35 to permit its weighted end to move inward and its upper end outward and release the coin from its locked position between the fingers 36 and 37.

*Register and slotway locking mechanisms.*—At the right-hand end of the shaft 83 is secured an arm 90, which has pivoted at its upper end a weighted pawl 91, adapted to engage the teeth of a ratchet-wheel 92, journaled on a stud 93 of an arm 94, secured to the frame of the machine. A spring 95 serves to prevent backward movement of the ratchet-wheel, and a pin 96 serves to limit the backward movement of the arm 90. The said wheel is provided with a pin 97, which at every revolution of the wheel engages a movable locking-rod 98, which slides in a vertical opening in a lug 99 back of the recess 8, so that when raised the rod will lock the movable slide 18 against inward movement and prevent the insertion of a coin, and as the ratchet-teeth in the wheel 92 correspond in number to the cigars in the box it will be seen that when the box is exhausted the machine cannot be operated until the empty box has been replaced by a filled one.

The mechanism is to be inclosed in a suitable casing provided with proper openings for the push-rod of the movable slide and the operating-lever. It is also provided with a coin-orifice which coincides with the coin-orifice 9 in the top edge of the back plate and with a circular opening having a glass cover, as indicated in dotted lines in Fig. 3, in order that the proper persons can readily ascertain if the cigar-box is properly provided with the required revenue-stamp.

*The general operation.*—To prepare our machine for operation, a box of cigars, stamped with the required revenue-stamp, is placed upon the oscillating table and secured thereon by the clamping device, one of the ends of the box being first removed to permit the cigars to freely roll out into the grooves as the drum is rotated. When the machine is in readiness, with a number of cigar-filled grooves sufficient to bring one of the cigars into contact with the curved arm, by pushing the slide in until the top opening therein coincides with the coin-orifice the proper coin can be deposited, and when deposited the slide is released. Upon releasing the slide the spring 23 forces it back to its normal position and the coin is discharged, as heretofore described, onto the bottom plate 24 and thence onto the tilting lever, which tilts under the weight of the coin and deposits it in the slotway *b*, where it is caught by the fingers 36 and 37, disengaging the locking-bar 48 from the operating-lever and leaving said lever to be operated by the purchaser. In pushing down the lever the drum is caused to rotate one tooth of the ratchet-wheel and the cigar in the first filled groove forces the end of the curved arm 86 outward, rocking the shaft 83 and causing the pin 85 on the arm 84 to rise upward out of contact with the finger-lever 35, leaving the lower weighted end of said finger-lever free to swing inward and release the coin, which rolls down the chute into its receptacle. As the end of the curved arm moves outward the cigar drops into the depression in the drawer beneath the base of the machine, where it can be reached by the purchaser on pulling out said drawer. At the same time the cigar is being delivered into the depression in the drawer another cigar is being fed into a groove in the drum. When the coin has been released, the finger-lever swings inward, carrying with it the locking-bar 48, the detent of which again engages the operating-lever and locks it against further operation until another proper coin is deposited in the coin-orifice. At each operation of delivering a cigar the detent of the arm engages one of the partitions of the drum and locks said drum against further rotation. When the operating-lever is released, the forward end of the oscillating platform falls downward and the slot engages the edge of a partition and locks the drum against rotating until the operating-lever is again operated by the deposit of a proper coin.

Having thus fully described our invention, what we claim as new, and desire to secure by Letters Patent, is—

1. In a coin-controlled machine, the combination of a coin-slotway provided with a hollow movable coin-slide, a tilting lever, two sets of coin-receiving fingers, and means for holding the coin confined in said fingers, substantially as specified.

2. In a coin-controlled machine, the combination with the coin-slotway provided with a spring-actuated hollow coin-slide, a tilting lever, two sets of coin-receiving fingers, means for holding the coin confined in said fingers, and means for releasing the coin, substantially as specified.

3. In a coin-controlled machine, the combination with a coin-slotway, of two sets of fingers arranged at one end of the slotway to receive the coin, one of said sets of fingers adapted to unlock the operating-lever and the other set adapted to release the coin.

4. In a coin-controlled machine, the combination with a coin-slotway, of two sets of coin-receiving fingers, one set provided with a weighted end and normally held against movement by a movable stop, and the other set attached to a locking-bar, whereby the operating-lever is unlocked when the coin is received by the fingers.

5. In a coin-controlled machine for vending cigars, of the coin-slotway provided with a recess at one end, and a coin-orifice at the top of said recess, a movable slide located in said recess, a spring bearing against the said slide to hold it normally in position to close the coin-orifice and permit it to be pressed back for the insertion of a coin and restore it to position after the coin has been deposited, substantially as specified.

6. The combination with the coin-slotway having a recess and coin-receiving slide at one end and a recess and passage for the discharge of improper coins, of the connected two-armed and tilting angle-levers which form normally a floor for the slotway of improper coins which will direct said coin to its exit, but the position of which will be shifted by a proper coin to drop said coin to the slotway below, substantially as specified.

7. The combination with the upper slotway, its bottom plate, the weighted finger-lever fulcrumed between the front and back plates, and the tilting angle-lever adapted normally to close the opening at the bottom of the upper slotway, of the rock-shaft, the operating-lever thereof, the arm mounted on said shaft and provided with a weighted pawl, the ratchet-wheel operated by the said pawl and provided with a projection on one face and the vertically-movable rod, the projection serving to elevate the rod at each revolution of the wheel to lock the coin-slide when the allotted number of cigars have been vended, substantially as specified.

8. In a cigar-vending machine, the combination with a rotary cigar-conveyer, having longitudinal peripheral grooves, or recesses, of an oscillating cigar-box support, having a gate arranged to control the delivery of the cigars into said grooves or recesses and provided with a forwardly-extending arm, and an operating-lever for actuating said arm to oscillate the cigar-box support.

9. In a cigar-vending machine, the combination of an oscillating table or support for a box of cigars, arranged to deliver cigars to a conveyer, a rotating cigar-conveyer provided with a ratchet-wheel, an operating-lever carrying a pawl adapted to engage the teeth of the ratchet-wheel and rotate the conveyer with a step-by-step movement when the operating-lever is operated, and means attached to the table or support and connecting with said operating-lever whereby said table is oscillated to feed a cigar into the conveyer when the operating-lever is operated.

10. In a coin-controlled machine, the combination with a rotatable cigar-conveyer, having peripheral longitudinal grooves or recesses, an oscillating cigar-box support arranged to deliver cigars into the grooves or recesses, a gate for controlling the delivery of the cigars, mechanism for operating the oscillating support and conveyer simultaneously, and mechanism carried by said oscillating support for locking said conveyer against rotation.

11. The combination in a coin-controlled machine for vending cigars, of a drum provided with a series of peripheral recesses to receive the cigars, an oscillating table adapted to carry a box of cigars, a swinging plate adapted to control the delivery of the cigars, said plate provided with a slotted arm working on a pin on the frame of the machine and having a detent to engage one of the dividing partitions or wings of the drum, and mechanism for operating the whole, substantially as specified, 12. The combination with the oscillating table slotted on opposite sides and provided with screw-threaded clamping-jaws, a right and left threaded screw passing through said jaws and journaled in a lug on the under side of the table, by means of which screw the clamps may be operated to secure the box, substantially as specified.

13. The combination, in a coin-controlled vending-machine, of a cigar-conveyer having longitudinal recesses for the reception of cigars, spring-arms arranged to temporarily hold the cigars in said recesses, a curved lever, secured upon a rock-shaft, having its lower end arranged to be operated by a cigar in the lower or first recess when the conveyer is turned, coin-receiving fingers, and means for rotating the conveyer one step to cause the cigar to tip the curved lever and release the cigar and coin-receiving fingers.

14. The combination with the recessed partitions or wings of the drum, of the curved lever having its lower end setting within the path of the recess and secured to a rock-shaft provided with an arm carrying a stop, a weighted lever fulcrumed to the frame and provided with fingers, a lever having corresponding fingers adapted to temporarily hold the coin, after passing through the coin-passage, until the cigar in one of the lower recesses of the drum trips the curved lever and causes the same to release one of the finger-levers, substantially as specified.

15. In a coin-controlled machine for vending cigars, the combination with the delivery-drum and mechanism for operating the same, of levers provided with coin-arresting fingers, a detent-lever connected to one side finger-lever, a rock-shaft provided with a weighted lever adapted to be operated by a cigar in one of the recesses of the drum, and an arm secured to said rock-shaft and provided with a stop-pin which bears against one of the finger-levers normally, to temporarily hold the coin, and which is released from the said finger when the rock-shaft is rocked by a cigar to drop the coin and allow the parts to assume a normal position, substantially as specified.

In testimony whereof we affix our signatures in the presence of two witnesses.

GEORGE E. EMERSON.
LOUIS G. MERRITT.

Witnesses:
DAVID MILLAR,
FRED D. MOYER.